US012246412B2

(12) United States Patent
Chen et al.

(10) Patent No.: US 12,246,412 B2
(45) Date of Patent: Mar. 11, 2025

(54) REMOVAL TOOL KIT AND REMOVAL TOOL THEREFOR

(71) Applicant: JS Products, Inc., Las Vegas, NV (US)

(72) Inventors: Chungeng Chen, Las Vegas, NV (US); Travis Cottle, Glenview, IL (US); Frank Hennessey, Des Plaines, IL (US); Joseph Irwin, Algonquin, IL (US); Jim McNelis, Naperville, IL (US)

(73) Assignees: JS Products, Inc., Las Vegas, NV (US); GTI Energy, Des Plaines, IL (US)

( * ) Notice: Subject to any disclaimer, the term of this patent is extended or adjusted under 35 U.S.C. 154(b) by 749 days.

(21) Appl. No.: 17/245,827

(22) Filed: Apr. 30, 2021

(65) Prior Publication Data

US 2021/0347015 A1 Nov. 11, 2021

Related U.S. Application Data

(60) Provisional application No. 62/704,333, filed on May 5, 2020, provisional application No. 63/126,719, filed on Dec. 17, 2020.

(51) Int. Cl.
*B25B 13/42* (2006.01)
*B25B 13/16* (2006.01)
*B25B 13/50* (2006.01)

(52) U.S. Cl.
CPC .............. *B25B 13/42* (2013.01); *B25B 13/16* (2013.01); *B25B 13/50* (2013.01)

(58) Field of Classification Search
CPC ......... B25B 13/42; B25B 13/16; B25B 13/50; B25B 23/0085; B25B 23/0078
USPC ........................ 81/57.36, 57.34, 57.32, 57.39
See application file for complete search history.

(56) References Cited

U.S. PATENT DOCUMENTS

| | | | | |
|---|---|---|---|---|
| 378,299 | A * | 2/1888 | Finch | B25B 13/488 81/57.32 |
| 1,402,391 | A | 1/1922 | Baldus | |
| 2,540,553 | A | 2/1951 | Shobe | |
| 3,880,024 | A * | 4/1975 | Asada | B25B 13/52 81/57.39 |
| 5,062,326 | A * | 11/1991 | Goldschmidt | B25B 13/488 81/57.32 |
| 5,201,256 | A | 4/1993 | Schneider | |

(Continued)

FOREIGN PATENT DOCUMENTS

| | | |
|---|---|---|
| CN | 108422374 | 11/2019 |
| CN | 116214441 | 6/2023 |

(Continued)

*Primary Examiner* — Hadi Shakeri
(74) *Attorney, Agent, or Firm* — Snell & Wilmer LLP

(57) ABSTRACT

A removal tool is provided. The removal tool includes a wrench apparatus having a body having a handle, wherein a portion of the body is structured to engage a securing member. The removal tool also includes a locking tool assembly and a transfer assembly. The locking tool assembly has a first jaw, a second jaw coupled to the first jaw, and a handle extending from the first jaw, the first and second jaws being structured to engage a conduit. The conduit is coupled to the securing member. The transfer assembly is coupled to the handles of the wrench apparatus and the locking tool assembly in order to transfer a force therebetween, thereby allowing the securing member to be removed from the conduit.

16 Claims, 9 Drawing Sheets

(56) References Cited

U.S. PATENT DOCUMENTS

| | | | |
|---|---|---|---|
| 5,546,833 A | 8/1996 | Holderman et al. | |
| 5,775,183 A | 7/1998 | Tavianini | |
| 6,931,965 B1 * | 8/2005 | Fanguy | B25B 13/5008 81/57.39 |
| 7,246,546 B1 * | 7/2007 | Knoblock | B25B 13/488 81/184 |
| 7,628,212 B2 | 12/2009 | Tjader | |
| RE43,348 E | 5/2012 | Qualman et al. | |
| 8,191,638 B2 | 6/2012 | Tjader | |
| 8,342,200 B1 | 1/2013 | Payne | |
| 9,358,673 B2 * | 6/2016 | Overton | B25B 13/48 |
| 2022/0009059 A1 | 1/2022 | Smith et al. | |

FOREIGN PATENT DOCUMENTS

| | | |
|---|---|---|
| DE | 102005003762 | 8/2006 |
| DE | 102010015592 | 10/2011 |
| DE | 202020004924 | 10/2021 |
| FR | 26687343 | 11/1995 |
| GB | 2249509 | 9/1993 |
| GB | 2282093 | 3/1995 |
| WO | 2011092477 | 8/2011 |
| WO | 2013143107 | 3/2013 |

* cited by examiner

REMOVAL TOOL KIT AND REMOVAL TOOL THEREFOR

CROSS REFERENCE TO RELATED APPLICATIONS

This application claims priority to and claims the benefit of U.S. Provisional Patent Application Ser. No. 62/704,333, filed May 5, 2020, and U.S. Provisional Patent Application Ser. No. 63/126,719, filed Dec. 17, 2020, the contents of which are incorporated herein by reference in their entirety.

BACKGROUND

Field

The disclosed concept relates to removal tool kits, and also to removal tools for removal tool kits.

Background

In many settings, securing members, such as nuts and/or swivel collars, are firmly secured to conduits, such as pipes. Gas companies throughout the world deal with these components when they send field technicians to remove and replace old gas meters that are faulty or damaged. Most of these aged gas meters, such as an example prior art gas meter 2, shown in FIG. 1, are heavily corroded due to weathering. Gas meter 2 includes a number of conduits (e.g., pipes 10, 20) and a corresponding number of securing members (e.g., nuts 12, 22) secured to pipes 10, 20 in order to connect meter 2 to external apparatus. In practice, nuts 12, 22 are extremely hard to break loose and remove. This is because conventional pipe wrenches or water pump pliers either do not have enough mechanical leverage or require strenuous human effort to break the collar loose. Therefore, there is a need for a compact, flexible, and powerful tool to do the job conveniently.

SUMMARY

In accordance with one aspect of the disclosed concept, a removal tool includes a wrench apparatus, a locking tool assembly, and a transfer assembly. The wrench apparatus has a body having a handle, and a portion of the body is structured to engage a securing member. The locking tool assembly includes a first jaw, a second jaw coupled to the first jaw, and a handle extending from the first jaw. The first and second jaws are structured to engage a conduit. The conduit is coupled to the securing member. The transfer assembly is coupled to the handles of the wrench apparatus and the locking tool assembly in order to transfer a force therebetween, thereby allowing the securing member to be removed from the conduit.

In accordance with yet another aspect of the disclosed concept, a removal tool kit includes the aforementioned removal tool, as well as a driving apparatus. The transfer assembly has a drive component coupled to the handle of the locking tool assembly. The driving apparatus is structured to engage and drive the drive component in order to transfer the force between the wrench apparatus and the locking tool assembly.

BRIEF DESCRIPTION OF THE DRAWINGS

Features and advantages of this disclosure, and the manner of attaining them, will become more apparent and the disclosure itself will be better understood by reference to the following descriptions of embodiments of the disclosure taken in conjunction with the accompanying FIGS., wherein.

DETAILED DESCRIPTION OF EMBODIMENTS

As employed herein, the term "coupled" shall mean connected either directly (e.g., such that two components are engaging) or indirectly through one or more intermediate parts or components.

As employed herein, the term "number" shall mean one or an integer greater than one (e.g., a plurality).

Figure 1:
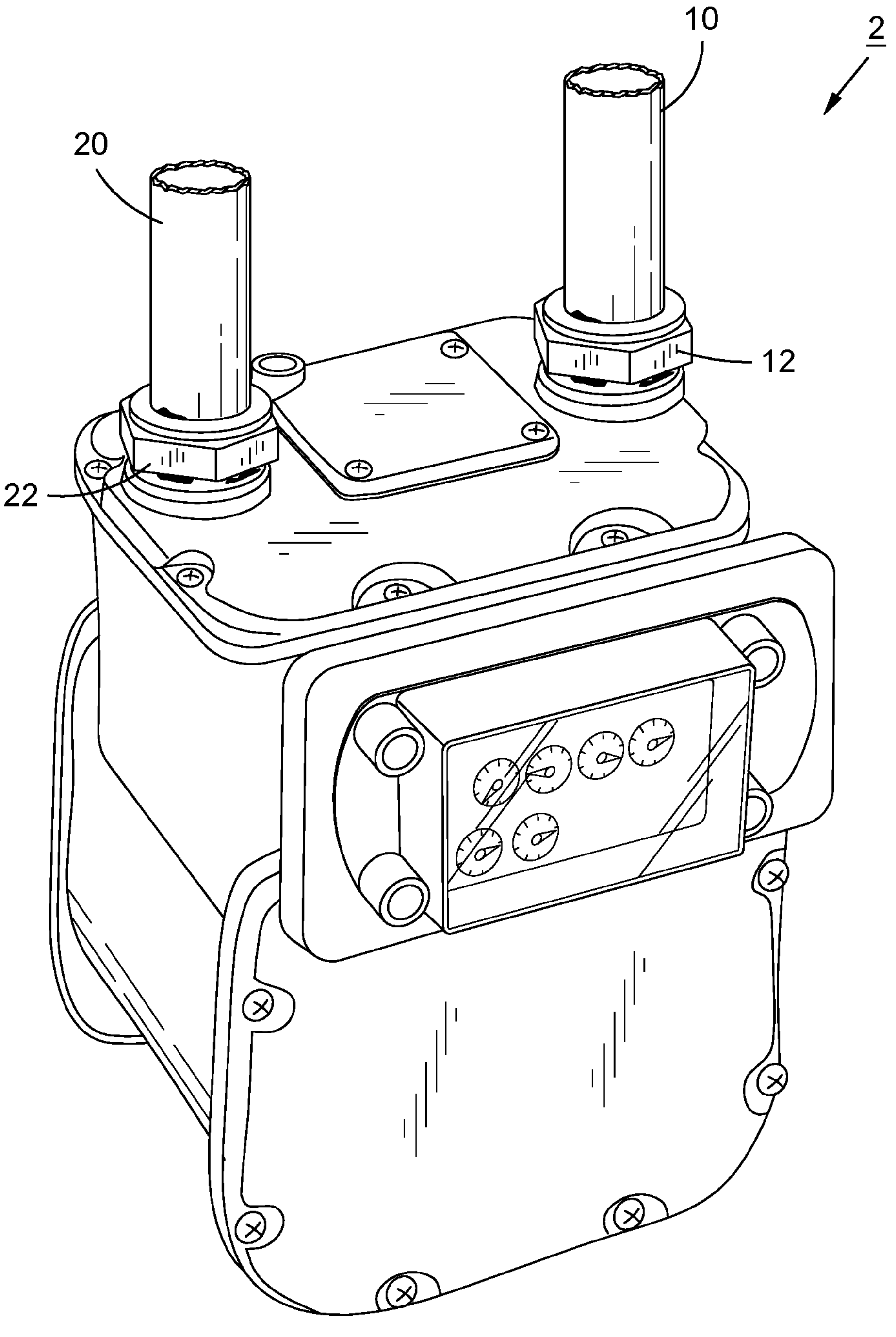
FIG. 1 (Prior Art)
FIG. 1 is an isometric view of a prior art gas meter.
Figure 2:
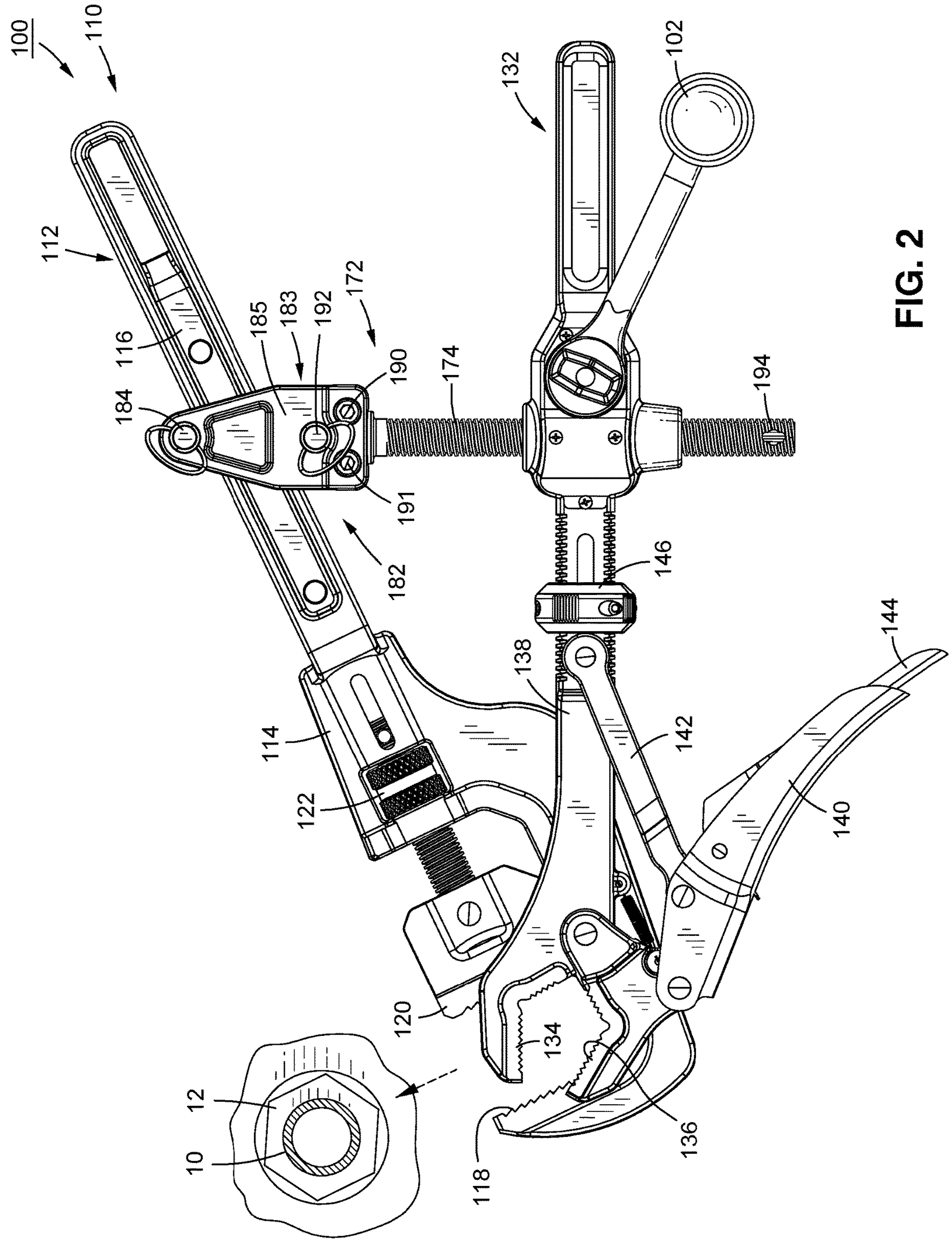
FIG. 2 is a plan view of a removal tool kit and removal tool therefor, in accordance with one non-limiting embodiment of the disclosed concept, and shown exploded from a portion of the prior art gas meter of FIG. 1.

FIG. 2 is a plan view of a removal tool kit 100, in accordance with one non-limiting embodiment of the disclosed concept, and is shown exploded from pipe 10 and nut 12 of the prior art gas meter 2. Example removal tool kit 100 includes a crank handle 102 and a removal tool 110 configured to engage the crank handle 102. The removal tool 110 includes a wrench apparatus 112, a locking tool assembly 132, and a transfer assembly 172. The wrench apparatus 112 is configured to be secured to the nut 12 while the locking tool assembly 132 is configured to be secured to the pipe 10. As will be discussed in greater detail below, the wrench apparatus 112, the locking tool assembly 132, and the transfer assembly 172 cooperate with one another in order to allow the nut 12 to be removed from the pipe 10 with significantly greater ease than is possible with known devices and methods. More specifically, the removal tool 110 advantageously allows a very high working torque to be applied to a portion of the wrench apparatus 112 which engages the nut 12, thereby allowing the nut 12 to be removed from the pipe 10 with relative ease.

Figure 3:
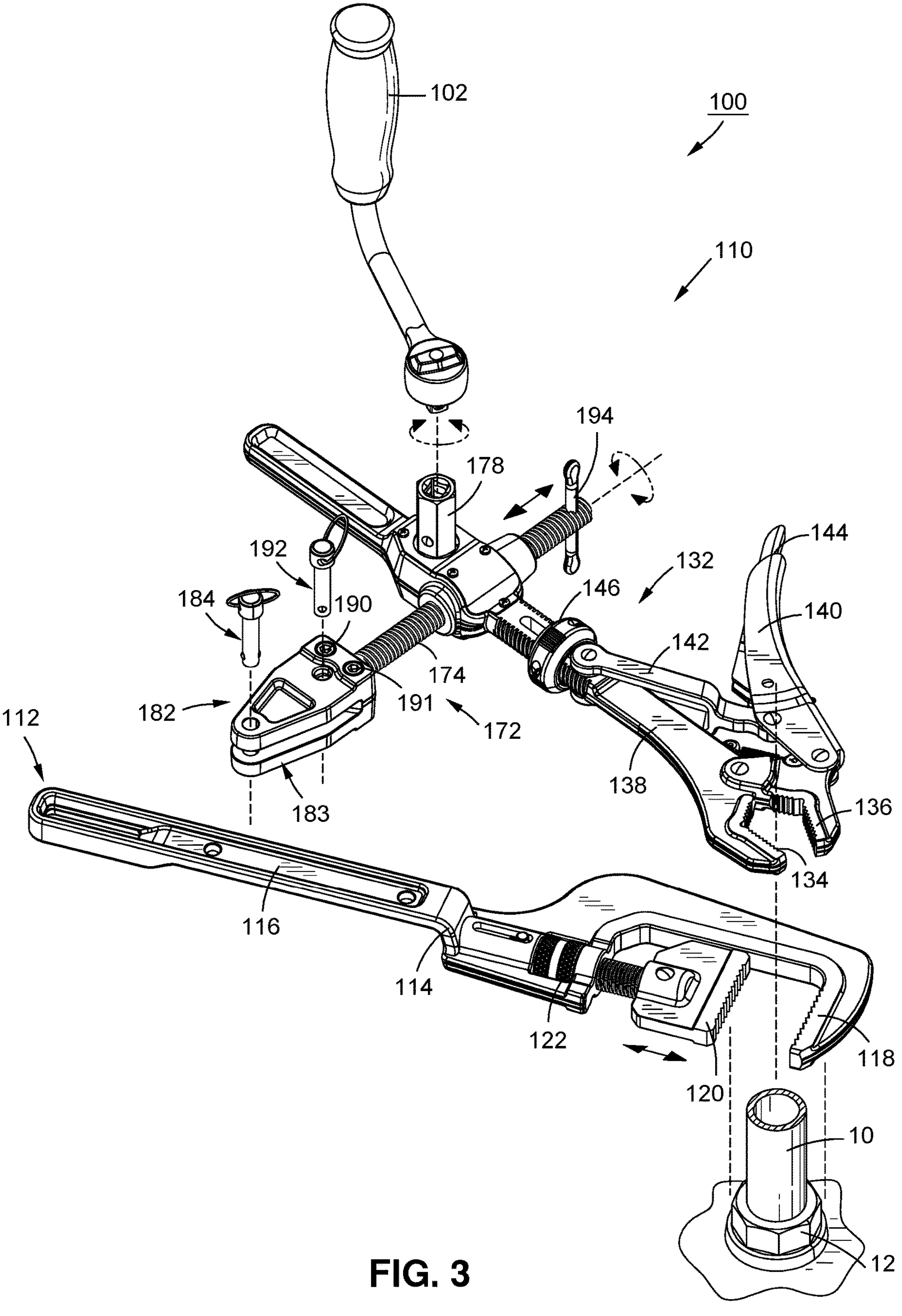
FIG. 3 is a partially exploded isometric view of the removal tool kit and removal tool therefor of FIG. 2, exploded from the portion of the prior art gas meter.

FIG. 3 shows a partially exploded view of the removal tool kit 100. As shown, the wrench apparatus 112 includes a body 114 having a handle 116. A portion (e.g., a first jaw 118) of body 114 is structured to engage and be secured to nut 12. Additionally, wrench apparatus 112 (also shown clearly in FIG. 6) further has another or second jaw 120 movably coupled to the body 114, and an adjustment mechanism (e.g., nut 122) located on and threadably coupled to the body 114. It will be appreciated that the nut 122 is structured to move the second jaw 120 with respect to the first jaw 118 in order to tighten and loosen engagement of the wrench apparatus 112 with respect to the nut 12. This may present as a user positioning the nut 12 between the jaws 118, 120, and then rotating the nut 122 in order to move the second jaw 120 towards the first jaw 118, thus tightening the engagement. This tight engagement ensures that the nut 12 will eventually be able to be removed from the pipe 10. As will be discussed below, the locking tool assembly 132 and the transfer assembly 172 function to transfer a relatively large force to the wrench apparatus 112, thereby allowing the nut 12 to be removed from the pipe 10 with relative ease. In order to perform this function, the transfer assembly 172 is coupled to the handle 116 of the wrench apparatus 112 and a handle 138 of the locking tool assembly 132 in order to transfer the force.

Figure 4:
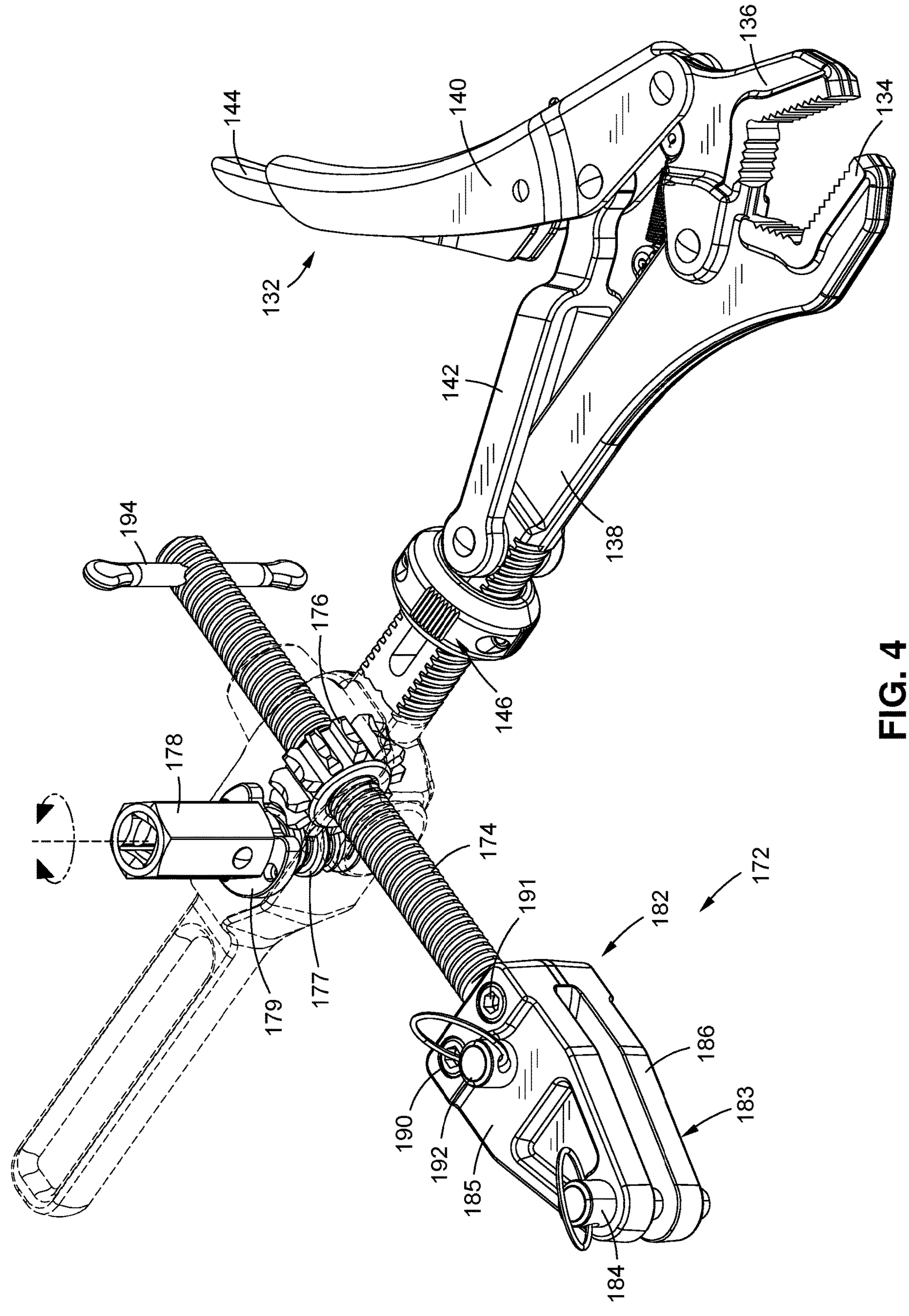
FIG. 4 is an isometric view of a locking tool assembly and transfer assembly for the removal tool of FIG. 3, and shown with a portion of the locking tool assembly in dashed line drawing in order to see hidden features.
Figure 5:
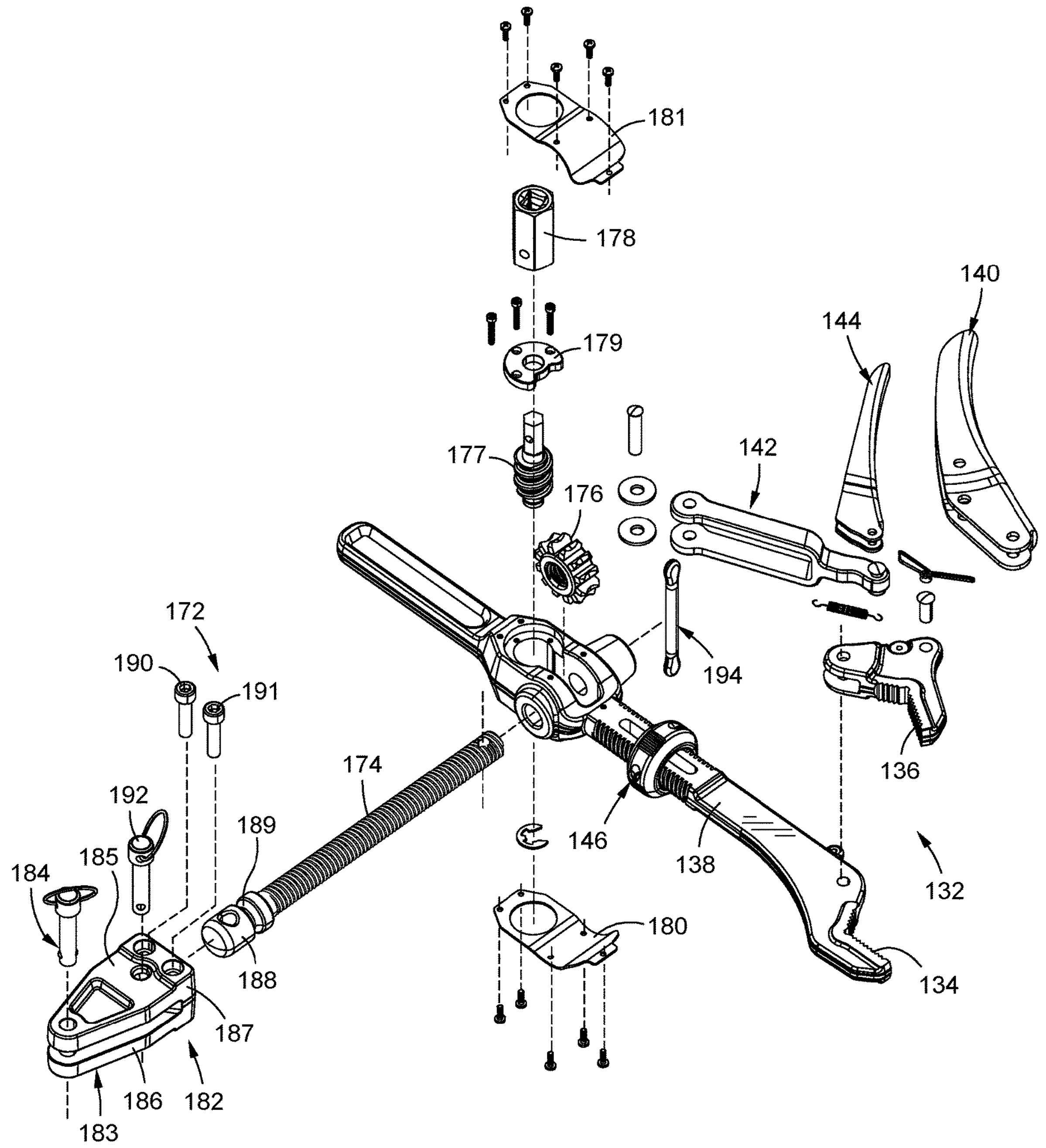
FIG. 5 is an exploded isometric view of the locking tool assembly and transfer assembly of FIG. 4.

Referring to FIGS. 4 and 5, the locking tool assembly 132 includes a first jaw 134, a second jaw 136 coupled to the first jaw 134, and a handle 138 extending from the first jaw 134. It will be appreciated that the first and second jaws 134, 136 are structured to engage the pipe 10 while the first and second jaws 118, 120 of the wrench apparatus 112 are engaging the nut 12. The locking tool assembly 132 further includes a locking handle 140, a linkage member 142, a release lever 144, and an adjustment nut 146. The locking handle 140 is coupled to the second jaw 136 and the linkage member 142. The linkage member 142 is coupled to the handle 138. The locking handle 140 moves between a tightened position and a loosened position corresponding to tight and loose engagement, respectively, between the jaws 134, 136 and the pipe 10. Additionally, when the locking handle 140 is in the tightened position, pressing of the release lever 144 causes the locking handle 140 to move toward the loosened position (e.g., to allow the locking tool assembly 132 to be removed from the pipe 10 once the nut 12 is loosened). Moreover, the adjustment nut 146 is threadably coupled to the handle 138. As can be appreciated from the FIGS., and as will be discussed below, the locking handle 140, the linkage member 142, and the adjustment nut 146 allow the first and second jaws 134, 136 to be secured to the pipe 10.

Referring again to FIG. 5, the transfer assembly 172, and its function of transferring a force between the locking tool assembly 132 and the wrench apparatus 112, will now be discussed in detail. As shown, the transfer assembly 172 includes a rod (e.g., such as a threaded pusher rod 174) extending between the handle (not shown in FIG. 5, but see handle 116 in FIGS. 2-3) of the wrench apparatus and handle 138 of locking tool assembly 132. It will be appreciated that a position of the pusher rod 174 is adjustable relative to the locking tool assembly 132. Specifically, rotation of the pusher rod 174 causes the position of the pusher rod 174 to move (e.g., translate) with respect to the locking tool assembly 132. When this is done, and when the distance between the handles of the wrench apparatus 112 and the locking tool assembly 132 increases, as will be discussed below, large amounts of leverage are imparted onto the wrench apparatus 112 (FIGS. 2-3). This leverage allows the nut 12 to be removed from the pipe 10 with relative ease.

Continuing to refer to FIG. 5, the transfer assembly 172 further includes a number of drive components (e.g., a gear member 176, a worm member 177, and a drive shaft 178) coupled to the handle 138 (see FIG. 4) and being cooperable with each other in order to adjust the position of the pusher rod 174 relative to the locking tool assembly 132. In one example embodiment, the gear member 176 is coupled to the handle 138 and is located in a slot of handle 138. Furthermore, the pusher rod 174 is threadably coupled to and extends through the gear member 176 (e.g., and also through the handle 138 in the example embodiment). It will thus be appreciated that rotation of the gear member 176 will cause the position of the pusher rod 174 to change (e.g., lengthen or shorten) with respect to the locking tool assembly 132, e.g., due to the threaded engagement between these components.

In one example embodiment, the worm member 177 may drive rotation of the gear member 176, and the drive shaft 178 may rotate the worm member 177 and be driven by a driving apparatus (e.g., without limitation, the crank handle 102, shown in FIGS. 2-3). In order to support the driving components 176, 177, 178, the transfer assembly 172 further includes a securing plate 179 and a number of mounting plates 180, 181. The securing and mounting plates 179, 180, 181 may be secured to the handle 138 proximate a central slot with fasteners (shown but not labeled). The securing plate 179 has a thru hole in order to allow a portion of the worm member 177 to extend therethrough, yet be securely maintained on the handle 138 as a result of the coupling of the securing plate 179 to the handle 138. Furthermore, the mounting plates 180, 181 are configured to be secured to the handle 130 proximate the central slot via fasteners (shown but not labeled), and function to maintain the position of the drive shaft 178 with respect to the handle 138, and allow drive shaft to stably rotate about an axis. Accordingly, in the instant example embodiment, responsive to rotation of crank handle 102 (FIGS. 2-3), such as by a user grasping and rotating the crank handle 102, the drive shaft 178 is rotated as a result of engagement between the crank handle 102 and the drive shaft 178, which in turn causes the worm member 177 to rotate (e.g., as a result of coupling between the worm member 177 and the drive shaft 178), which causes the gear member 176 to rotate, and thus the pusher rod 174 to rotate and translate, thereby transferring force between the wrench apparatus 112 and the locking tool assembly 132. It will, however, be appreciated that other suitable numbers and configurations of drive components may be employed by an alternative transfer assembly (not shown) in order to perform the desired function of transferring force between the locking tool assembly 132 and the wrench apparatus 112.

In order for the aforementioned translation of the pusher rod 174 to impart leverage onto the wrench apparatus 112 (FIGS. 2-3), and thus transfer force from the locking tool assembly 132 to the wrench apparatus 112 (FIGS. 2-3), the transfer assembly 172 further includes a transfer apparatus 182 coupled to the pusher rod 174 and configured to be coupled to the handle 116 (FIGS. 2-3) of the wrench apparatus 112. As shown in FIG. 5, the transfer apparatus 182 includes a jaw member 183, a number of pins (two example pins 184, 192 are shown in FIG. 5), and a number of fasteners (two example fasteners 190, 191 are shown in FIG. 5). The jaw member 183 has a first portion 185, a second portion 186, and a middle portion 187 extending therebetween. It will be appreciated that the pusher rod 174, which has a head 188 having a grooved portion 189, is configured to extend through the middle portion 187 of the jaw member 183. Furthermore, the fasteners 190, 191, which extend at least partially through the middle portion 187, each engage grooved portion 189 in order to allow the head 188 to rotate with respect to the middle portion 187 without the moving toward or away from the pin 184. In other words, when the pusher rod 174 is rotating, and translating with respect to the locking tool assembly 132, the pusher rod 174 will only be rotating with respect to the jaw member 183. That is, the fasteners 190, 191 advantageously engage the grooved portion 189 on opposing sides to prevent the pusher rod 174 from translating, while still allowing the pusher rod 174 to rotate.

Figure 6:
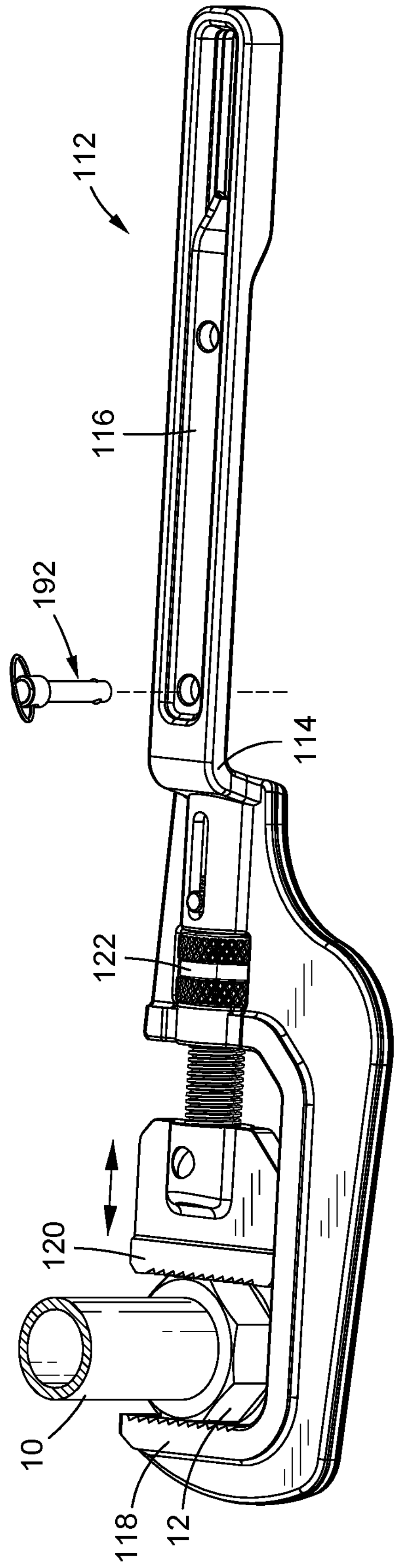
FIG. 6 is a partially exploded view of a wrench apparatus for the removal tool, shown with a portion of the prior art gas meter of FIG. 1.
Figure 7:
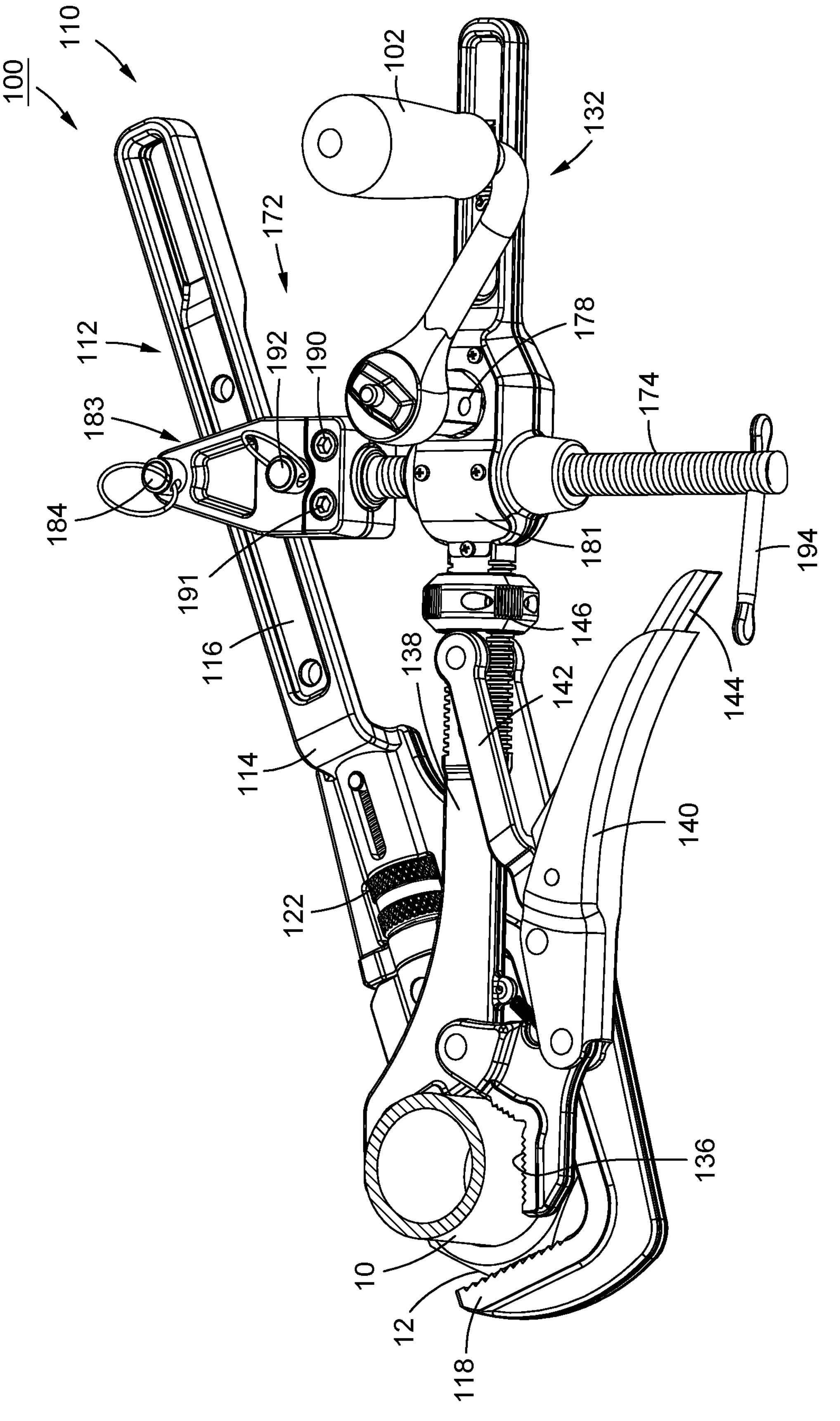
FIG. 7 shows an isometric view of the removal tool kit and removal tool therefor, with the portion of the prior art gas meter of FIG. 1, in a first position.
Figure 8:
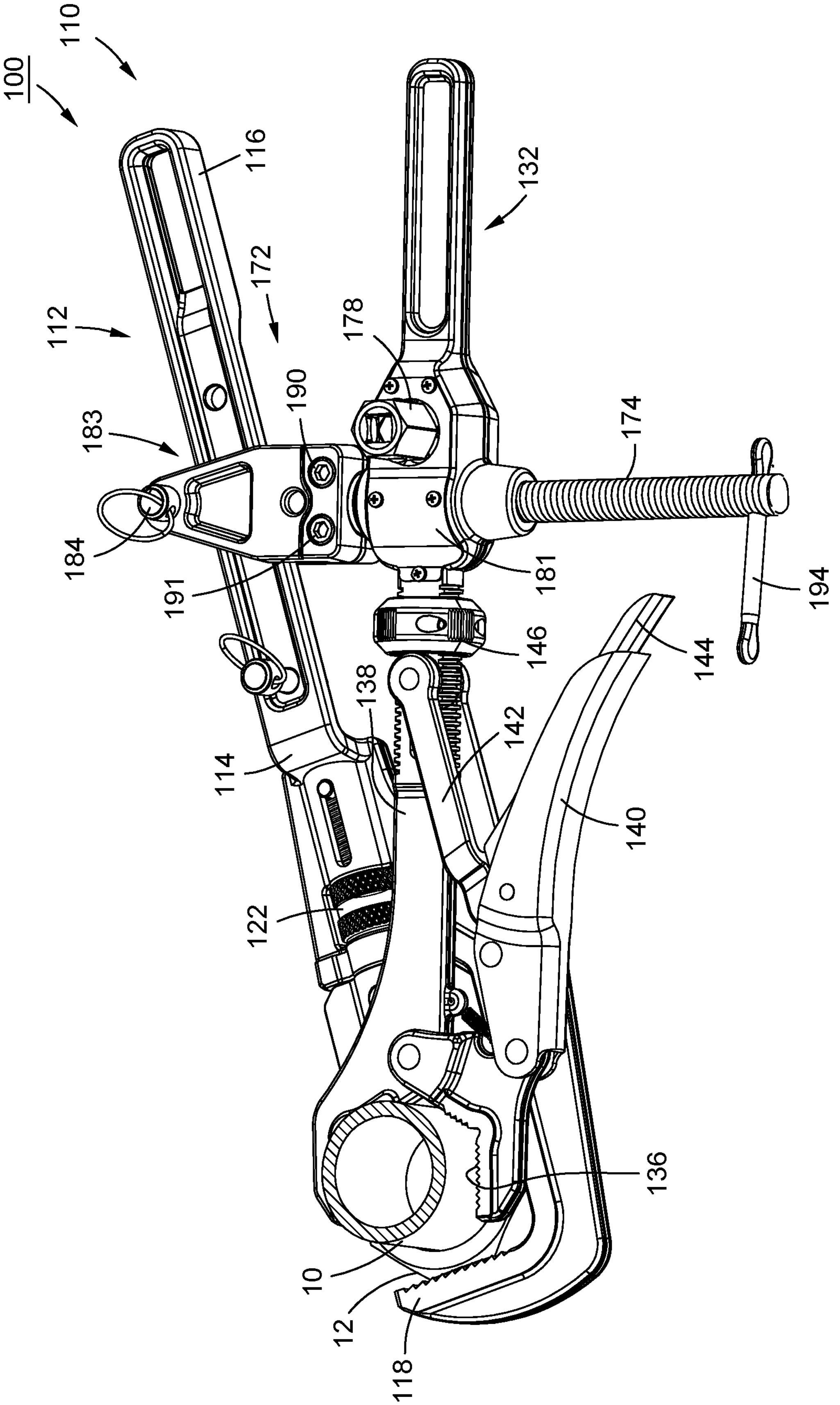
FIG. 8 shows an isometric view of the removal tool of FIG. 7, with the portion of the prior art gas meter of FIG. 1, in a second position.

Referring to FIGS. 7-8, as partially shown, the handle 116 of the wrench apparatus 112 is located between the first and second portions 185, 186. Furthermore, in the example of FIGS. 7-8, the pins 184, 192, which extend through the first and second portions 185, 186 of the jaw member 183, are located on opposing sides of the handle 116, and are configured to push and pull the handle 116, in order to impart leverage on and remove leverage from the handle 116. Additionally, when not in use, the pin 192 may be extended through a thru hole in the handle 116 for storage purposes, as shown in FIG. 6. Continuing, FIG. 7 shows the transfer assembly 172 in a first position and FIG. 8 shows the transfer assembly 172 in a second position. It will be appreciated that a region of the threaded portion of the pusher rod 174 is visible between the jaw member 183 and the mounting plate 181 in FIG. 7, and in FIG. 8 no portion is visible.

One example method of removing the nut 12 from the pipe 10 will now be discussed in detail. First, once the wrench apparatus 112 is secured to the nut 12 in the manner discussed above, the jaws 134, 136 of the locking tool assembly 132 can be positioned around the pipe 10. Second, the first and second portions 185, 186 of the jaw member 183 can be positioned such that the handle 116 of the wrench apparatus 112 is located therebetween (e.g., with the pin 184 disconnected from the jaw member 183), and then the pin 184 can be inserted through the thru hole in the first and second portions 185, 186 to position the jaw member 183 on the handle 116. Third, the adjustment nut 146 can be rotated with respect to the handle 138 in a first direction, causing a portion of the linkage member 142 to be driven toward the jaw 134. When this is done, the locking handle 140 and the second jaw 136 are caused to move toward a tighter engagement with the pipe 10. Fourth, responsive to movement of the locking handle 140 toward the handle 138 (e.g., a user squeezing the locking handle 140 toward a closed position), the second jaw 136 moves towards the first jaw 134 in order to tighten the engagement of the jaws 134, 136 with the pipe 10. Finally, with the removal tool 110 positioned and configured in this manner, the nut 12 may be removed from the pipe 10 in a number of different manners.

More specifically, the nut 12 may be removed via a simple rotation of the crank handle 102 to move the pusher rod 174 from the position depicted in FIG. 8 to the position depicted in FIG. 7. Additionally, as shown, the transfer assembly 172 further includes a cross pin 194 extending through the pusher rod 174. The cross pin 194 may have a number of different functions. First, it may engage the handle 138 in order to prevent the pusher rod 174 from being pulled therethrough. Second, the cross pin 194 may be grasped and rotated by a user, causing rotation of the pusher rod 174 in order to move the pusher rod 174 from the position depicted in FIG. 8 to the position depicted in FIG. 7, thereby removing the nut 12 from the pipe 10.

Figure 9:
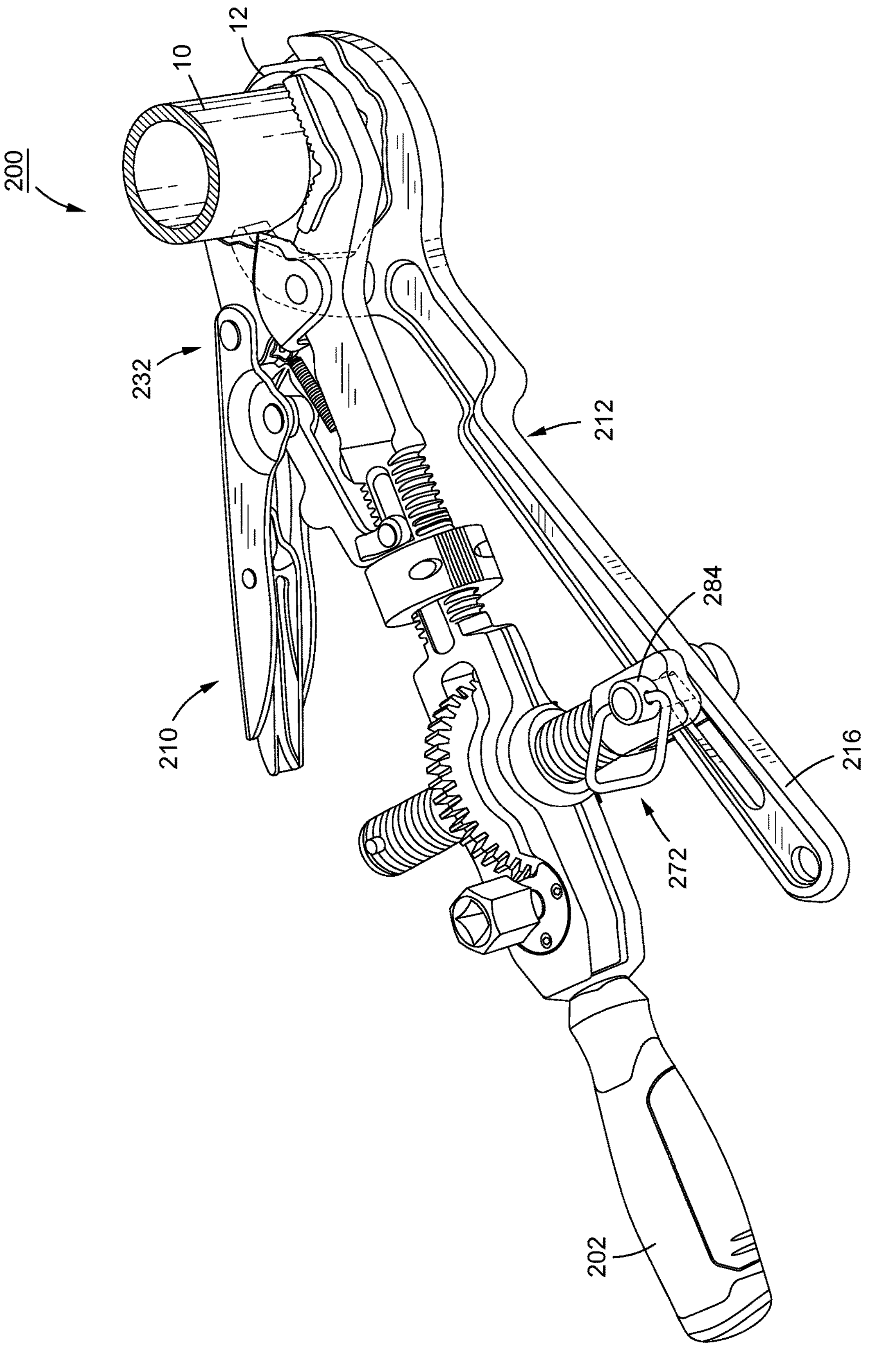
FIG. 9 shows an isometric view of a removal tool kit, partially shown in dashed line drawing in order to see hidden features, with a portion of the prior art gas meter of FIG. 1, in accordance with another non-limiting embodiment of the disclosed concept.

In yet a further manner of removing the nut 12 from the pipe 10, depicted in FIG. 9, wherein like reference numbers represent like components, a screwdriver 202 (or other tool) may be employed as a driving apparatus and rotated in order to move the transfer assembly 272 between positions. Continuing to refer to FIG. 9, as shown, in the example embodiment the wrench apparatus 212 is a unitary component made from a single piece of material. Furthermore, the pin 284 of the transfer assembly 272 extends through a slot in the handle 216 of wrench apparatus. In this embodiment where the wrench apparatus 212 is a unitary component (such as being of an "open-ended wrench" configuration, where the wrench may be configured to engage a single size nut), the tool kit 200 may include a plurality of different sizes of wrench apparatus 212 (e.g. 2 inch, 2.25 inch, 2.5 inch, etc.), such as for engaging nuts of different sizes, wherein the different wrench apparatus 212 may be interchanged for use with the transfer assembly 272.

It will therefore be appreciated that the disclosed concept provides for an improved removal tool kit 100, 200 and removal tool 110, 210 therefor, in which a wrench apparatus 112, 212, locking tool assembly 132, 232, and transfer assembly 172, 272 cooperate to impart significantly increased leverage to a nut 12 in order to remove the nut 12 from a pipe 10. As a result, operators working in the field will now advantageously not have to overly tax themselves and/or be unable to remove securing members (e.g., nuts) from conduits (e.g., pipes) as a result of having equipment that cannot impart necessary leverage.

The embodiments of FIGS. 2-8 and FIG. 9 are two of the many non-limiting examples of the disclosed concept. That is, while this disclosure has been described as having exemplary methods, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed:

1. A removal tool comprising:

a wrench apparatus comprising a body having a handle, wherein a portion of the body is structured to engage a securing member;

a locking tool assembly comprising a first jaw, a second jaw coupled to the first jaw, and a handle extending from the first jaw, the first and second jaws being structured to engage a conduit, the conduit being coupled to the securing member; and a transfer assembly coupled to the handles of the wrench apparatus and the locking tool assembly in order to transfer a force therebetween, thereby allowing the securing member to be removed from the conduit, wherein the transfer assembly comprises a pusher rod extending between the handles of the wrench apparatus and the locking tool assembly, wherein a position of the pusher rod is adjustable relative to the locking tool assembly, wherein the transfer assembly further comprises a number of drive components coupled to the handle of the locking tool assembly, wherein the number of drive components are cooperable with each other in order to adjust the position of the pusher rod relative to the locking tool assembly, wherein the number of drive components comprises a gear member coupled to the handle of the locking tool assembly and threadably coupled to the pusher rod, a worm member structured to drive the gear member, and a drive shaft structured to rotate the worm member and be driven by a driving apparatus.

2. The removal tool according to claim 1, wherein the transfer assembly further comprises a transfer apparatus coupled to the pusher rod and the handle of the wrench apparatus in order to allow the force to be transferred therebetween.

3. The removal tool according to claim 2, wherein the transfer apparatus comprises a jaw member and a pin; wherein the jaw member of the transfer apparatus comprises a first portion, a second portion, and a middle portion extending therebetween; wherein the handle of the wrench apparatus is disposed between the first portion and the second portion; and wherein the pin extends through the first portion and the second portion.

4. The removal tool according to claim 3, wherein the pusher rod comprises a head having a grooved portion; wherein the transfer assembly further comprises a first fastener and a second fastener each extending at least partially through the middle portion; and wherein the first and second fasteners each engage the grooved portion in order to allow the head to rotate with respect to the middle portion without moving toward or away from the pin.

5. The removal tool according to claim 3, wherein the pin extends through the handle of the wrench apparatus.

6. The removal tool according to claim 1, wherein the pusher rod extends through the handle of the locking tool assembly.

7. The removal tool according to claim 1, wherein the locking tool assembly further comprises a locking handle and a linkage member; wherein the locking handle is coupled to the second jaw and the linkage member; wherein the linkage member is coupled to the handle of the locking tool assembly; and wherein, responsive to movement of the locking handle toward the handle of the locking tool assembly, the second jaw moves toward the first jaw in order to tighten the engagement of the first and second jaws with the conduit.

8. The removal tool according to claim 7, wherein the locking handle is structured to move between a tightened position and a loosened position corresponding to tight and loose engagement, respectively, between the first and second jaws and the conduit; wherein the locking tool assembly further comprises a release lever coupled to the locking handle, and wherein, when the locking handle is in the tightened position, pressing of the release lever causes the locking handle to move toward the loosened position.

9. The removal tool according to claim 7 wherein the locking tool assembly further comprises an adjustment nut threadably coupled to the handle of the locking tool assembly; and wherein, responsive to rotation of the adjustment nut with respect to the handle of the locking tool assembly in a first direction, a portion of the linkage member is driven toward the first jaw.

10. The removal tool according to claim 1, wherein the transfer assembly further comprises a cross pin extending through the pusher rod; and wherein the cross pin is structured to engage the handle of the locking tool assembly in order to prevent the pusher rod from being pulled therethrough.

11. The removal tool according to claim 1, wherein the wrench apparatus is a unitary component made from a single piece of material.

12. The removal tool according to claim 1, wherein the portion of the body of the wrench apparatus structured to engage the securing member is a first jaw;

wherein the wrench apparatus further comprises a second jaw movably coupled to the body, and an adjustment mechanism disposed on the body and being structured to move the second jaw of the wrench apparatus with respect to the first jaw of the wrench apparatus in order to tighten and loosen engagement of the wrench apparatus with respect to the securing member.

13. The removal tool according to claim 12, wherein the adjustment mechanism is a nut.

14. A removal tool kit comprising:

a removal tool comprising:

a wrench apparatus comprising a body having a handle, wherein a portion of the body is structured to engage a securing member, a locking tool assembly comprising a first jaw, a second jaw coupled to the first jaw, and a handle extending from the first jaw, the first and second jaws being structured to engage a conduit, the conduit being coupled to the securing member, and a transfer assembly coupled to the handles of the wrench apparatus and the locking tool assembly in order to transfer a force therebetween, thereby allowing the securing member to be removed from the conduit, the transfer assembly comprising a drive component coupled to the handle of the locking tool assembly; and a driving apparatus structured to engage and drive the drive component in order to transfer the force between the wrench apparatus and the locking tool assembly, wherein the drive component is a drive shaft, wherein the transfer assembly further comprises a gear member and a worm member, wherein the gear member is coupled to the handle of the locking tool assembly, and wherein the worm member is structured to engage and be rotated by the drive shaft in order to rotate the gear member, thereby transferring the force between the wrench apparatus and the locking tool assembly.

15. The removal tool kit according to claim 14, wherein the transfer assembly further comprises a pusher rod extending between the handles of the wrench apparatus and the locking tool assembly; and wherein, responsive to rotation of the driving apparatus, the drive component causes the pusher rod to rotate, thereby transferring the force between the wrench apparatus and the locking tool assembly.

16. The removal tool kit according to claim 14, wherein the driving apparatus is one of a crank handle and a screwdriver.

* * * * *